US012374283B2

(12) United States Patent
Wang

(10) Patent No.: US 12,374,283 B2
(45) Date of Patent: Jul. 29, 2025

(54) PIXEL CIRCUIT AND DRIVING METHOD THEREFOR, AND DISPLAY PANEL

(71) Applicant: KUNSHAN GO-VISIONOX OPTO-ELECTRONICS CO., LTD, Jiangsu (CN)

(72) Inventor: Gang Wang, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/240,741

(22) Filed: Aug. 31, 2023

(65) Prior Publication Data

US 2023/0410746 A1 Dec. 21, 2023

Related U.S. Application Data

(63) Continuation of application No. PCT/CN2022/086956, filed on Apr. 15, 2022.

(30) Foreign Application Priority Data

Sep. 30, 2021 (CN) .......................... 202111157187.2

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0852* (2013.01);
(Continued)

(58) Field of Classification Search
CPC ....... G09G 3/3233; G09G 3/3208; G09G 3/32
See application file for complete search history.

(56) References Cited

U.S. PATENT DOCUMENTS 10,242,620 B2 * 3/2019 Zhu ...................... G09G 3/3258
11,308,866 B2 * 4/2022 Tian ..................... G09G 3/3233
(Continued)

FOREIGN PATENT DOCUMENTS

CN 104751781 A 7/2015
CN 106652910 A 5/2017
(Continued)

OTHER PUBLICATIONS

International Search Report issued on Jun. 22, 2022, in corresponding International Application No. PCT/CN2022/086956, 8 pages.
(Continued)

*Primary Examiner* — Koosha Sharifi-Tafreshi
(74) *Attorney, Agent, or Firm* — Maier & Maier, PLLC

(57) ABSTRACT

A pixel circuit, a driving method therefor, and a display panel. The pixel circuit includes a driving module, a storage module, a data writing module, an initialization module, and a light emitting module. The driving module includes a dual gate transistor, a first electrode is connected to a first power supply, a second electrode is connected to a first terminal of the light emitting module, and a second terminal of the light emitting module is connected to a second power supply. The data writing module is connected between a first gate of the dual gate transistor and a data line. The storage module is connected to the first gate, a second gate, and the second electrode of the dual gate transistor. The initialization module is connected to the first gate, the second gate and the second electrode of the dual gate transistor and an initialization signal line.

19 Claims, 10 Drawing Sheets

(52) U.S. Cl.
CPC ............... *G09G 2310/0216* (2013.01); *G09G 2320/0233* (2013.01)

(56) References Cited

U.S. PATENT DOCUMENTS

| | | | | |
|---|---|---|---|---|
| 2008/0122381 | A1 | 5/2008 | Jung | |
| 2015/0187276 | A1* | 7/2015 | Shim | G09G 3/3291 345/77 |
| 2015/0187818 | A1 | 7/2015 | Miyake et al. | |
| 2016/0042694 | A1 | 2/2016 | Lim et al. | |
| 2016/0300900 | A1* | 10/2016 | Miyake | H10D 86/423 |
| 2018/0114799 | A1 | 4/2018 | Miyake | |
| 2019/0005882 | A1* | 1/2019 | Zhang | G09G 3/3258 |
| 2020/0320930 | A1 | 10/2020 | Toyotaka et al. | |
| 2021/0027706 | A1 | 1/2021 | Zhang et al. | |
| 2021/0375198 | A1* | 12/2021 | Zhang | G09G 3/325 |
| 2024/0339080 | A1* | 10/2024 | Zhou | G09G 3/3266 |

FOREIGN PATENT DOCUMENTS

| | | | |
|---|---|---|---|
| CN | 105741779 | B | 3/2018 |
| CN | 108597448 | A | 9/2018 |
| CN | 108711398 | A | 10/2018 |
| CN | 110706654 | A | 1/2020 |
| CN | 111179850 | A | 5/2020 |
| CN | 111354322 | A | 6/2020 |
| CN | 110992881 | B | 1/2021 |
| KR | 1020150077710 | A | 7/2015 |
| KR | 20160074772 | A | 6/2016 |

OTHER PUBLICATIONS

Office Action issued on Mar. 3, 2023, in related Taiwanese Patent Application No. 111117500, 14 pages.
Office Action issued on Jun. 30, 2024, in corresponding Korean Application No. 10-2023-7029170, 10 pages.
Extended Search Report issued on Oct. 7, 2024, in corresponding European Application No. 22874174.0, 20 pages.

* cited by examiner

PIXEL CIRCUIT AND DRIVING METHOD THEREFOR, AND DISPLAY PANEL

CROSS-REFERENCE TO RELATED APPLICATIONS

This application is a continuation of International Patent Application No. PCT/CN2022/086956, filed on Apr. 15, 2022, which claims priority to Chinese Patent Application No. 202111157187.2 filed on Sep. 30, 2021, the disclosures of which are incorporated herein by reference in their entireties.

TECHNICAL FIELD

Embodiments of the present application relate to display technologies, and more particularly, to a pixel circuit, a driving method for a pixel circuit, and a display panel.

BACKGROUND

The organic light emitting diode (OLED) display panel has characteristics such as low power consumption, low production cost, and self-light emission, and becomes a research focus in the current field.

In the related art, compensating a threshold voltage of a pixel circuit is generally used to improve uniformity of brightness of a whole display image. However, in this method, the range of compensation for the threshold voltage is relatively small and the requirement of display brightness uniformity cannot be met.

SUMMARY

A pixel circuit, a driving method for a pixel circuit, and a display panel are provided according to the present application to improve a threshold compensation capability of the pixel circuit and improve a display effect.

According to a first aspect, a pixel circuit is provided according to an embodiment of the present application, which includes a driving module, a storage module, a data writing module, an initialization module and a light emitting module. The driving module includes a dual gate transistor, a first electrode of the dual gate transistor is connected to a first power supply, a second electrode of the dual gate transistor is connected to a first terminal of the light emitting module, and a second terminal of the light emitting module is connected to a second power supply. The data writing module is connected between a first gate of the dual gate transistor and a data line, and is configured to transmit a data voltage output by the data line to the first gate of the dual gate transistor. The storage module is connected to the first gate of the dual gate transistor, a second gate of the dual gate transistor, and the second electrode of the dual gate transistor. The initialization module is connected to the first gate of the dual gate transistor, the second gate of the dual gate transistor and the second electrode of the dual gate transistor and an initialization signal line, and is configured to transmit a voltage provided by the initialization signal line to the first gate of the dual gate transistor, the second gate of the dual gate transistor, and the second electrode of the dual gate transistor and control the storage module to store association information of a threshold voltage of the dual gate transistor.

According to a second aspect, a driving method for a pixel circuit is provided according to an embodiment of the present application. The pixel circuit includes a driving module, a storage module, a data writing module, an initialization module and a light emitting module. The driving module includes a dual gate transistor, a first electrode of the dual gate transistor is connected to a first power supply, a second electrode of the dual gate transistor is connected to a first terminal of the light emitting module, and a second terminal of the light emitting module is connected to a second power supply. The data writing module is connected between a first gate of the dual gate transistor and a data line. The storage module is connected to the first gate of the dual gate transistor, a second gate of the dual gate transistor, and the second electrode of the dual gate transistor. The initialization module is connected to the first gate of the dual gate transistor, the second gate of the dual gate transistor and the second electrode of the dual gate transistor and an initialization signal line. The driving method includes: in an initialization stage, controlling the initialization module to transmit a corresponding initialization voltage to the first gate of the dual gate transistor, the second gate of the dual gate transistor, and the second electrode of the dual gate transistor; in a threshold detection stage, controlling the initialization module to store association information of a threshold voltage of the dual gate transistor; and in a data writing stage, controlling the data writing module to transmit a data voltage provided by the data line to the first gate.

According to a third aspect, a display panel is further provided according to an embodiment of the present application, which includes the pixel circuit according to any embodiment of the present application.

In the technical solutions according to the embodiments of the present application, the display effect is improved by designing a novel pixel circuit. The pixel circuit includes a driving module, a storage module, a data writing module, an initialization module and a light emitting module. The driving module includes a dual gate transistor. The data writing module is connected between a first gate of the dual gate transistor and a data line. The storage module is connected to the first gate, a second gate, and the second electrode of the dual gate transistor. The initialization module is connected to the first gate, the second gate and the second electrode of the dual gate transistor and an initialization signal line. According to the technical solution provided in the embodiments of the present invention, the initialization module controls the potentials of the first gate, the second gate and the second electrode of the dual gate transistor, and controls the first gate and the second electrode of the dual gate transistor to form a diode connection structure, to allow the threshold voltage of the dual gate transistor to be determined by a potential difference between the second gate and the second electrode of the dual gate transistor, thereby realizing the compensation effect of the threshold voltage of the dual gate transistor. The threshold compensation and the data writing are respectively realized through two separate paths, which do not affect each other. By controlling an on-duration of the initialization module, the duration of the compensation for the threshold voltage can be controlled, so that the threshold voltage fluctuation in a large range can be compensated, and the threshold voltage can be fully compensated, thereby facilitating improvement of the display effect.

DETAILED DESCRIPTION

Figure 1:
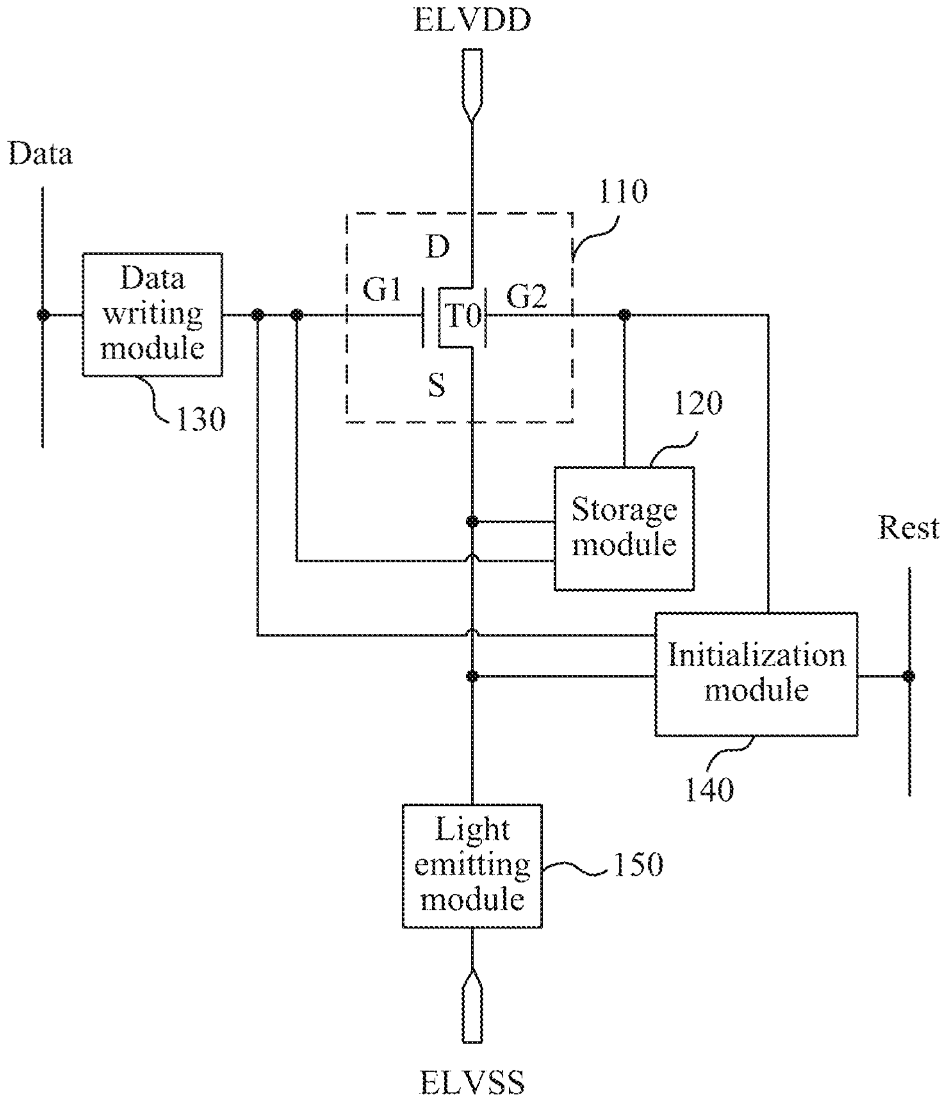
FIG. 1 is a schematic structural diagram of a pixel circuit according to an embodiment of the present application.

The present application is further described in detail hereinafter in conjunction with the drawings and embodiments. It may be appreciated that the embodiments described herein are merely intended for interpreting rather than limiting the present application. In addition, it is further to be noted that, for ease of description, only part of of the structures related to the present application rather than all are shown in the drawings.

Generally, the pixel circuit cannot meet the requirement for uniformity of display brightness. The reason for the above issue lies in that in a process of compensating a threshold voltage of the pixel circuit, the data writing and the threshold compensation are generally performed simultaneously, and a data writing module is controlled to be turned on to compensate the threshold voltage of the driving module, whereby the compensation duration is limited by an on-duration of the data writing module, so that the threshold compensation duration is fixed, causing that when the data writing ends, the threshold voltage is not fully compensated, so that the range of the compensation for the threshold voltage is limited. When the refresh rate is high, the duration of each frame may be compressed shorter, so that the duration of the threshold compensation is significantly reduced. For the driving circuits of different pixels, pixel circuits are different one from the other, so that driving currents generated by the pixel circuits are different, and the uniformity of the display brightness is further adversely affected.

In view of the above issues, a novel pixel circuit structure is provided according to an embodiment of the present application to improve uniformity of display brightness. FIG. 1 is a schematic structural diagram of a pixel circuit according to an embodiment of the present application. Referring to FIG. 1, the pixel circuit according to an embodiment of the present application includes a driving module 110, a storage module 120, a data writing module 130, an initialization module 140, and a light emitting module 150. The driving module 110 includes a dual gate transistor T0, a first electrode D of the dual gate transistor T0 is connected to a first power supply ELVDD, a second electrode S of the dual gate transistor T0 is connected to a first terminal of the light emitting module 150, and a second terminal of the light emitting module 150 is connected to a second power supply ELVSS. The data writing module 130 is connected between a first gate G1 of the dual gate transistor T0 and a data line Data, and is configured to transmit a data voltage output by the data line Data to the first gate G1. The storage module 120 is connected to the first gate G1, a second gate G2, and the second electrode S of the dual gate transistor T0. The initialization module 140 is connected to the first gate G1, the second gate G2 and the second electrode S of the dual gate transistor T0 and an initialization signal line Rest, and is configured to transmit a voltage provided by the initialization signal line Rest to the first gate G1, the second gate G2, and the second electrode S of the dual gate transistor T0, and control the storage module 120 to store association information of a threshold voltage of the dual gate transistor T0.

Specifically, the dual gate transistor T0 serves as a driving transistor of the pixel circuit to drive the light-emitting module 150 to emit light. Here, the dual gate transistor T0 is generally a vertical dual gate transistor, the first gate G1 may be a top gate, and the second gate G2 may be a bottom gate. The threshold voltage of the dual gate transistor T0 is adjusted by setting the voltage between the second gate G2 and the second electrode S of the dual gate transistor T0, so as to perform the extraction of and compensation for the threshold voltage.

An operation process of the pixel circuit according to an embodiment of the present application includes at least an initialization stage, a threshold detection stage and a data writing stage. As shown in FIG. 1, in the initialization stage, the initialization module 140 is turned on and transmits a voltage on the initialization signal line Rest to each of the first gate G1, the second gate G2, and the second electrode S of the dual gate transistor T0, to initialize the potentials of the first gate G1, the second gate G2, and the second electrode S of the dual gate transistor T0. The voltage difference between the voltage supplied by the initialization signal line Rest and the voltage provided by the second power supply ELVSS may be set to be smaller than a threshold voltage of the light emitting module 150 to ensure that the light emitting module 150 does not emit light in the initialization stage. In the initialization stage, the first gate G1 and the second electrode S of the dual gate transistor T0 are controlled by the initialization module 140 to form a diode connection to allow the potentials of the first gate G1 and the second electrode S of the dual gate transistor T0 to be equal, and the threshold voltage of the dual gate transistor T0 is adjusted to be greater than 0V (the dual gate transistor T0 is an N-type transistor) by configuring the voltage of the second gate G2 of the dual gate transistor T0, to allow the dual gate transistor T0 to be in an off state.

In the threshold detection stage, since the initialization module 140 controls the potentials of the first gate G1 and the second electrode S of the dual gate transistor T0 to be equal, that is, the voltage difference between the first gate G1 and the second electrode S of the dual gate transistor T0 is 0V, in this case, the threshold voltage of the dual gate transistor T0 is determined by a voltage difference between the second gate G2 and the second electrode S of the dual gate transistor T0. Specifically, in the threshold detection stage, the initialization module 140 is controlled to release the control to the voltage of the second electrode S of the dual gate transistor T0, and thus, the voltage of the second electrode S of the dual gate transistor T0 changes to the sum of the voltage provided by the second power supply ELVSS and the threshold voltage of the light emitting module 150. Further, the initializing module 140 controls the potential of the second gate G2 of the dual gate transistor T0 to be unchanged, and controls the first gate G1 and the second electrode S of the dual gate transistor T0 to maintain the diode connection mode. Since the potential of the second gate G2 is unchanged, the voltage difference between the second gate G2 and the second electrode S of the dual gate transistor T0 is changed, that is, the threshold voltage of the dual gate transistor T0 is changed, so that the dual gate transistor T0 is turned on. The above description may be simply understood as: since the voltage difference between the first gate G1 and the second electrode S of the dual gate transistor T0 is 0V, and the voltage of the second gate G2 remains unchanged, the voltage difference between the second gate G2 and the second electrode S is changed by changing the voltage of the second electrode S, so that the threshold voltage of the dual gate transistor T0 is smaller than 0V, and the dual gate transistor T0 is controlled to be turned on.

When the dual gate transistor T0 is turned on, the voltage on the first power supply ELVDD charges the second electrode S through the dual gate transistor T0, and the potentials of the second electrode S and the first gate G1 rise, however the voltage difference between the second electrode S and the first gate G1 is still 0V. When the voltage of the second electrode S is raised so that the threshold voltage of the dual gate transistor T0 is equal to the voltage difference between the first gate G1 and the second electrode S, that is, when the threshold voltage of the dual gate transistor T0 is 0V, the dual gate transistor T0 is turned off, and the storage module 120 stores the voltage of the second electrode S, thus, the detection of the threshold voltage of the dual gate transistor T0 is completed. In other words, the voltage difference between the first gate G1 and the second electrode S of the dual gate transistor T0 is controlled to be 0V, thereby, the association information of the threshold voltage of the dual gate transistor T0 stored in the storage module 120 is the voltage difference between the second gate G2 and the second electrode S of the dual gate transistor T0 when the threshold voltage of the dual gate transistor T0 is 0V.

In the data writing stage, the data writing module 130 is turned on and writes a data voltage transmitted on the data line Data into the first gate G1 of the dual gate transistor T0.

In the embodiment of the present application, since the threshold detection stage and the data writing stage are not performed at the same time, the duration of the threshold detection stage may be determined by an on-duration of the initialization module 140 and irrelevant to the duration of the data writing. That is, the initialization module 140 controls the storage module 120 to store association information of the threshold voltage of the dual gate transistor T0, to achieve extraction of the threshold voltage of the dual gate transistor T0, such that the data writing stage and the threshold detection stage do not affect each other. The duration of the threshold detection is adjusted by controlling the on-duration of the initialization module 140, thereby the threshold compensation in a large range can be realized, and the pixel circuit can adapt to the application scenarios of high refresh rate.

The pixel circuit according to the embodiments of the present application includes a driving module, a storage module, a data writing module, an initialization module, and a light emitting module. The driving module includes a dual gate transistor. The data writing module is connected between a first gate of the dual gate transistor and a data line. The storage module is connected to the first gate, a second gate, and the second electrode of the dual gate transistor. The initialization module is connected to the first gate, the second gate and the second electrode of the dual gate transistor and an initialization signal line. According to the technical solution provided in the embodiments of the present application, the initialization module controls the potentials of the first gate, the second gate and the second electrode of the dual gate transistor, and controls the first gate and the second electrode of the dual gate transistor to form a diode connection structure, to allow the threshold voltage of the dual gate transistor to be determined by a potential difference between the second gate and the second electrode, thereby realizing the compensation effect of the threshold voltage of the dual gate transistor. The threshold compensation and the data writing are respectively realized through two separate paths, which do not affect each other. By controlling an on-duration of the initialization module, the duration of the compensation for the threshold voltage can be controlled, so that the threshold voltage fluctuation in a large range can be compensated, and the threshold voltage can be fully compensated, thereby facilitating improvement of the display effect.

Figure 2:
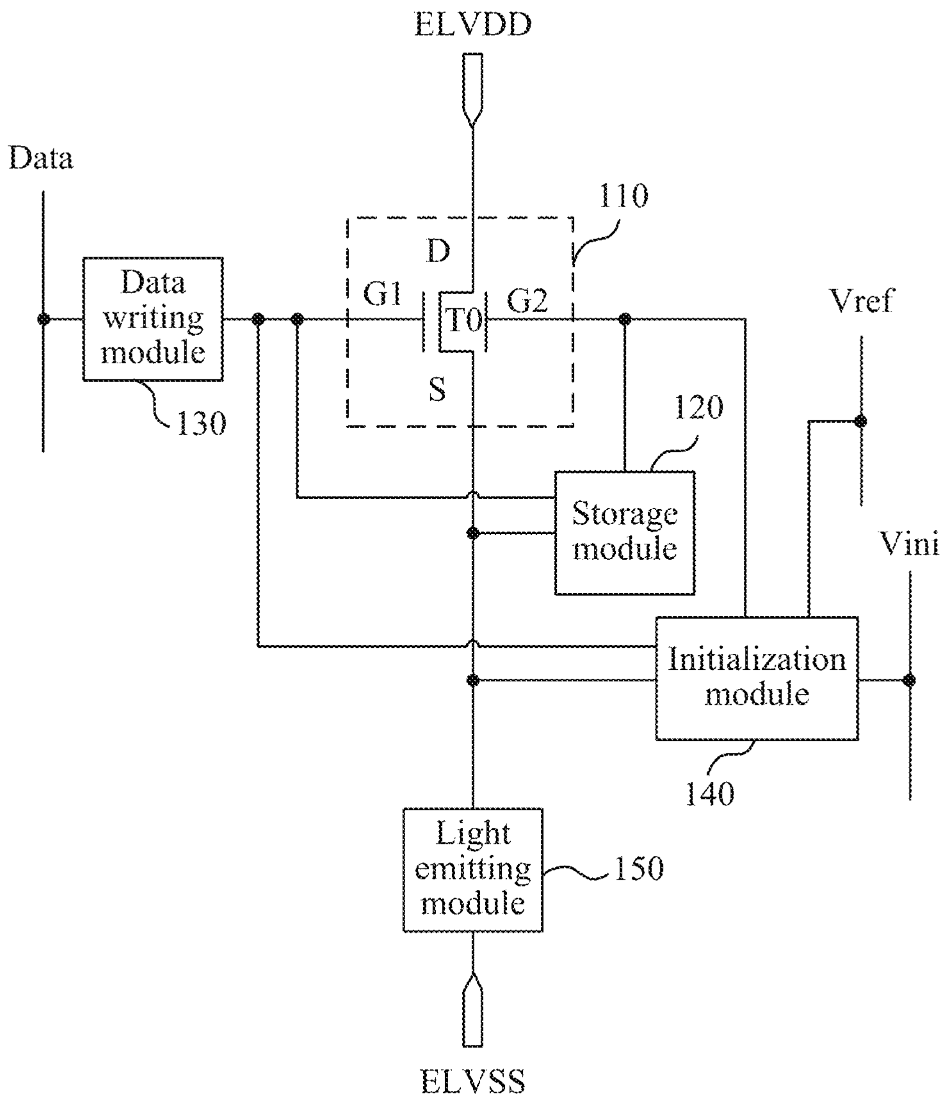
FIG. 2 is a schematic structural diagram of another pixel circuit according to an embodiment of the present application.

Optionally, FIG. 2 is a schematic structural diagram of another pixel circuit according to an embodiment of the present application. Referring to FIG. 2, on the basis of the above technical solution, the initialization signal line Rest includes a first initialization signal line Vref and a second initialization signal line Vini, and the initialization module 140 is configured to transmit a first initialization voltage provided by the first initialization signal line Vref to the second gate G2 and transmit a second initialization voltage provided by the second initialization signal line Vini to the first gate G1 and the second electrode S of the dual gate transistor T0.

Specifically, different initialization voltages may be transmitted to the first gate G1, the second gate G2 and the second electrode S of the dual gate transistor T0 respectively through the first initialization signal line Vref and the second initialization signal line Vini, so as to initialize the first gate G1, the second gate G2 and the second electrode S of the dual gate transistor T0. By configuring the initialization voltages supplied by the first initialization signal line Vref and the second initialization signal line Vini, it is advantageous to control the dual gate transistor T0 to be turned off in the initialization stage and ensure the voltage at the first terminal of the light-emitting module 150 be smaller than the voltage at the second terminal of the light-emitting module 150, thereby preventing the light-emitting module 150 from emitting light in this stage. Optionally, the data line Data may be reused as the first initialization signal line Vref. In the initialization stage, the initialization voltage is supplied to the initialization module 140 through the data line Data, so that the number of the first initialization signal lines Vref can be reduced, and the pixels per inch (PPI) can be increased. In the data writing stage, the voltage transmitted on the data line Data jumps to the data voltage to perform the data voltage writing to the first gate of the dual gate transistor T0.

Figure 3:
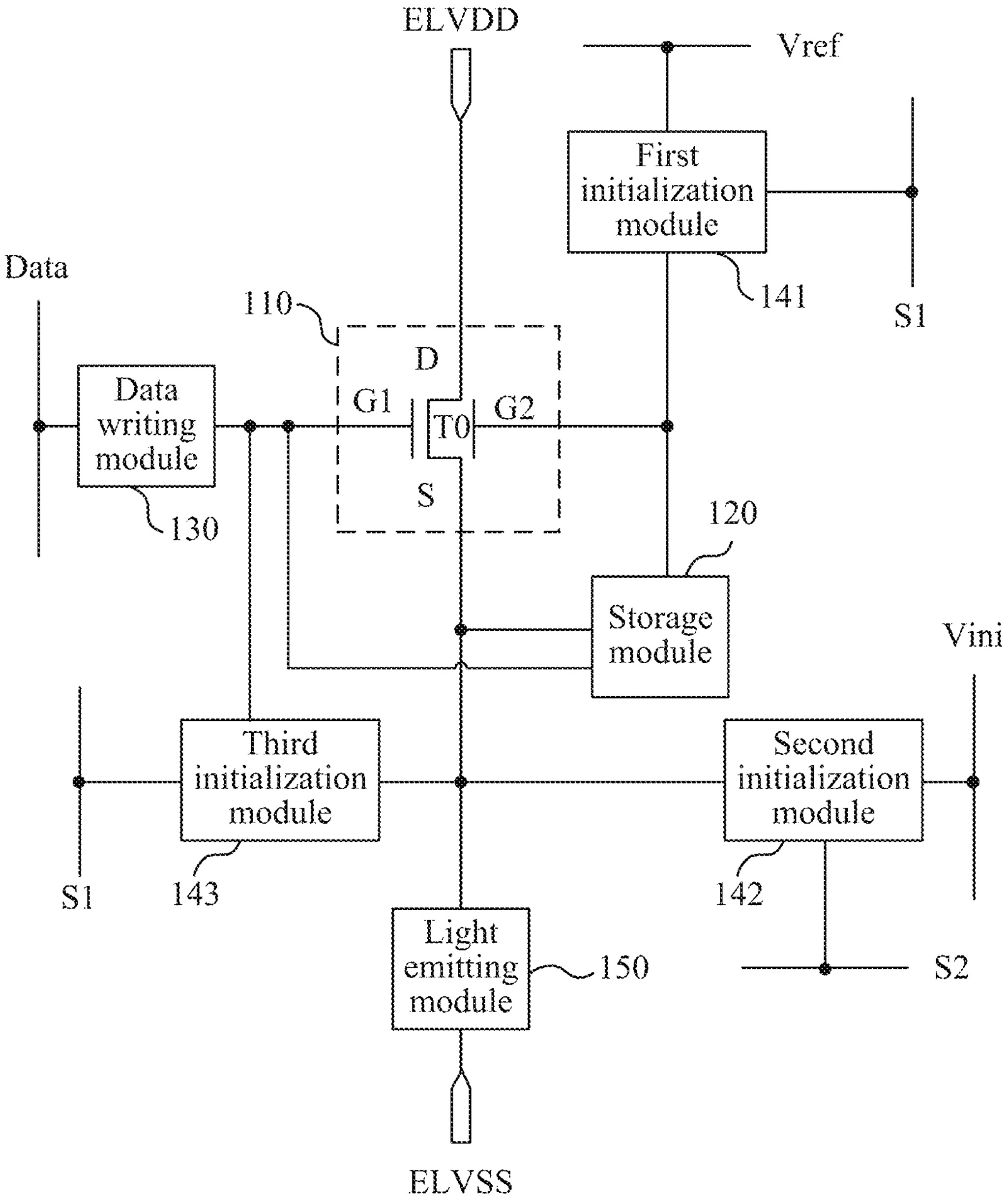
FIG. 3 is a schematic structural diagram of another pixel circuit according to an embodiment of the present application.

Further, in the threshold detection stage, the potential of the second gate G2 of the dual gate transistor T0 is to be maintained stable, and the initialization module 140 no longer controls the potential of the second electrode S of the dual gate transistor T0, therefore, the first gate G1, the second gate G2, and the second electrode S of the dual gate transistor T0 can be respectively controlled through different paths. For convenience of description, in this embodiment, a signal line and the voltage on the corresponding signal line are denoted by the same reference numeral. FIG. 3 is a schematic structural diagram of another pixel circuit according to an embodiment of the present application. Referring to FIG. 3, based on the above technical solution, the initialization module 140 includes a first initialization module 141, a second initialization module 142 and a third initialization module 143. The first initialization module 141 is connected between the first initialization signal line Vref and the second gate G2, and a control terminal of the first initialization module 141 is connected to a first scanning line S1. The second initialization module 142 is connected between the second initialization signal line Vini and the second electrode S of the dual gate transistor T0, and a control terminal of the second initialization module 142 is connected to a second scanning line S2. The third initialization module 143 is connected between the first gate G1 and the second electrode S of the dual gate transistor T0, and a control terminal of the third initialization module 143 is connected to the first scanning line S1. In other embodiments according to embodiments of the present application, the first initialization signal line Vref and the second initialization signal line Vini may be combined into one line. In other words, the first initialization module 141 and the second initialization module 142 are connected to the same initialization signal line, so that the number of initialization signal lines can be reduced, the PPI can be improved, and the cost can be reduced.

Specifically, both the first initialization module 141 and the third initialization module 143 are controlled by the first scanning line S1, and the second initialization module 142 is controlled by the second scanning line S2. Specifically, the first initialization module 141 is configured to be turned on or off in response to a signal on the first scanning line S1, and the first initialization module 141, after being turned on, writes a first initialization voltage Vref to the second gate G2 of the dual gate transistor T0. The second initialization module 142 is configured to be turned on or off in response to a signal on the second scanning line S2, and the second initialization module 142, after being turned on, writes a second initialization voltage to the second electrode S of the dual gate transistor T0, and the third initialization module 143 is configured to write the second initialization voltage to the first gate G1 of the dual gate transistor T0 in response to a signal on the first scanning line S1.

Figure 4:
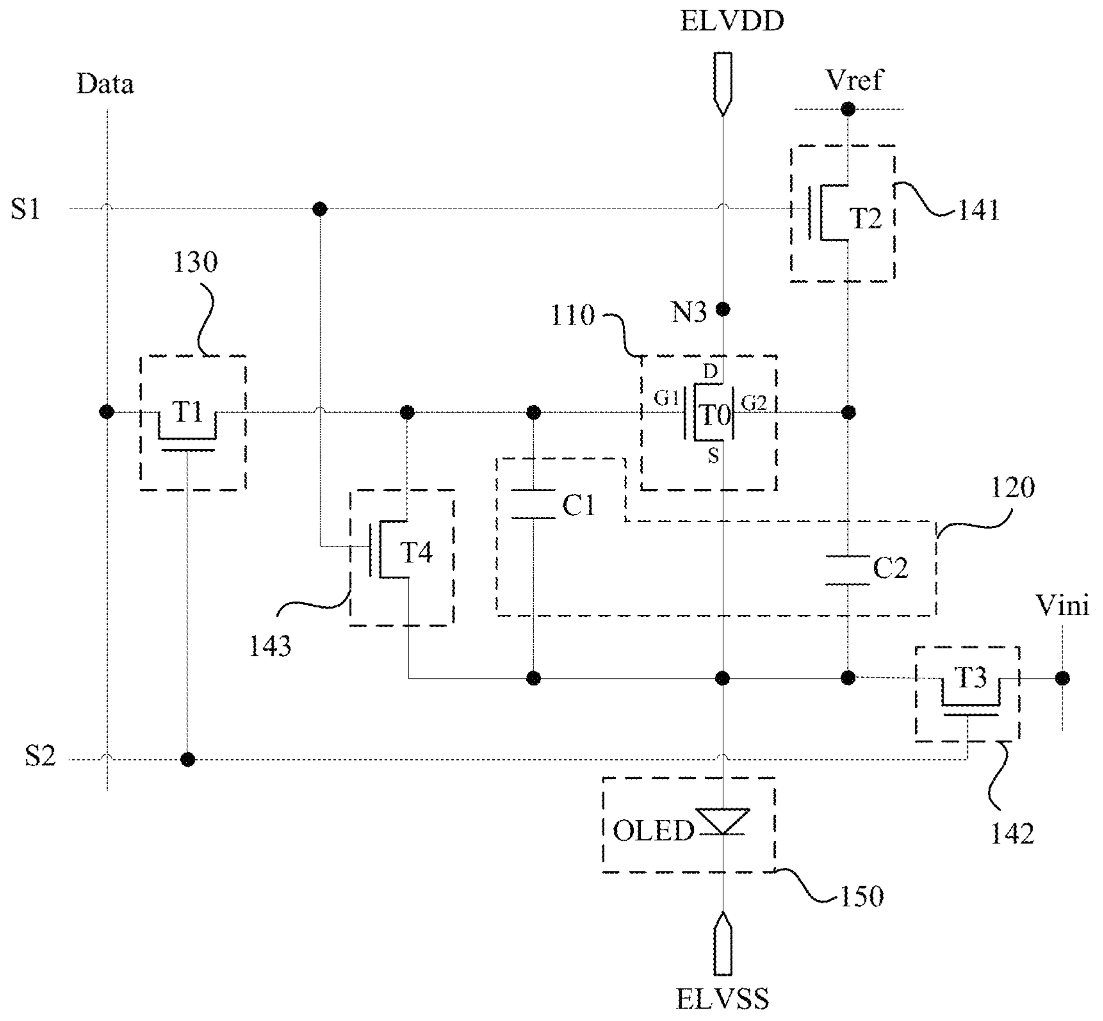
FIG. 4 is a schematic structural diagram of another pixel circuit according to an embodiment of the present application.

Optionally, FIG. 4 is a schematic structural diagram of another pixel circuit according to an embodiment of the present application, and shows a specific structure of the pixel circuit. Referring to FIG. 4, the data writing module 130 includes a first transistor T1, the first initialization module 141 includes a second transistor T2, the second initialization module 142 includes a third transistor T3, and the third initialization module 143 includes a fourth transistor T4; and the storage module 120 includes a first capacitor C1 and a second capacitor C2.

A first electrode of the first transistor T1 is connected to the data line Data, a second electrode of the first transistor T1 is connected to the first gate G1, and a gate of the first transistor T1 is connected to the second scanning line S2. A first electrode of the second transistor T2 is connected to the first initialization signal line Vref, a second electrode of the second transistor T2 is connected to the second gate G2, and a gate of the second transistor T2 is connected to the first scanning line S1. A first electrode of the third transistor T3 is connected to the second initialization signal line Vini, a second electrode of the third transistor T3 is connected to the second electrode S of the dual gate transistor T0, and a gate of the third transistor T3 is connected to the second scanning line S2. A first electrode of the fourth transistor T4 is connected to the first gate G1, a second electrode of the fourth transistor T4 is connected to the second electrode S of the dual gate transistor T0, and a gate of the fourth transistor T4 is connected to the first scanning line S1. The first capacitor C1 is connected between the first gate G1 and the second electrode S of the dual gate transistor T0, and the second capacitor C2 is connected between the second gate G2 and the second electrode S of the dual gate transistor T0.

Figure 5:
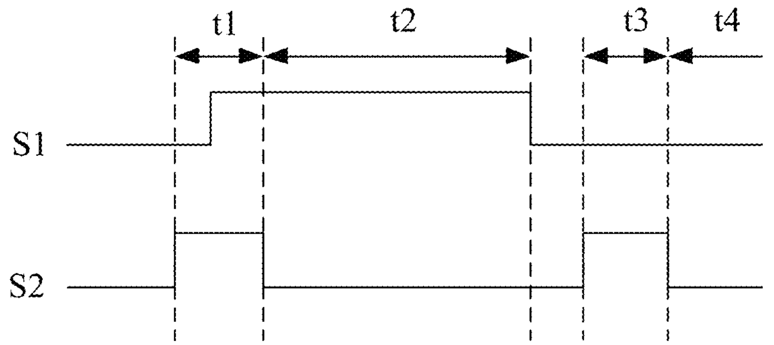
FIG. 5 is a control timing waveform diagram of a pixel circuit according to an embodiment of the present application.

In this embodiment, the dual gate transistor T0, the first transistor T1, the second transistor T2, the third transistor T3, and the fourth transistor T4 are all N-type transistors. FIG. 5 is a control timing waveform diagram of a pixel circuit according to an embodiment of the present application, and is applicable to the pixel circuit shown in FIG. 4. Referring to FIG. 4 and FIG. an operation process of the pixel circuit according to an embodiment of the present application includes at least an initialization stage t1, a threshold detection stage t2, a data writing stage t3 and a light emission stage t4.

Figure 6:
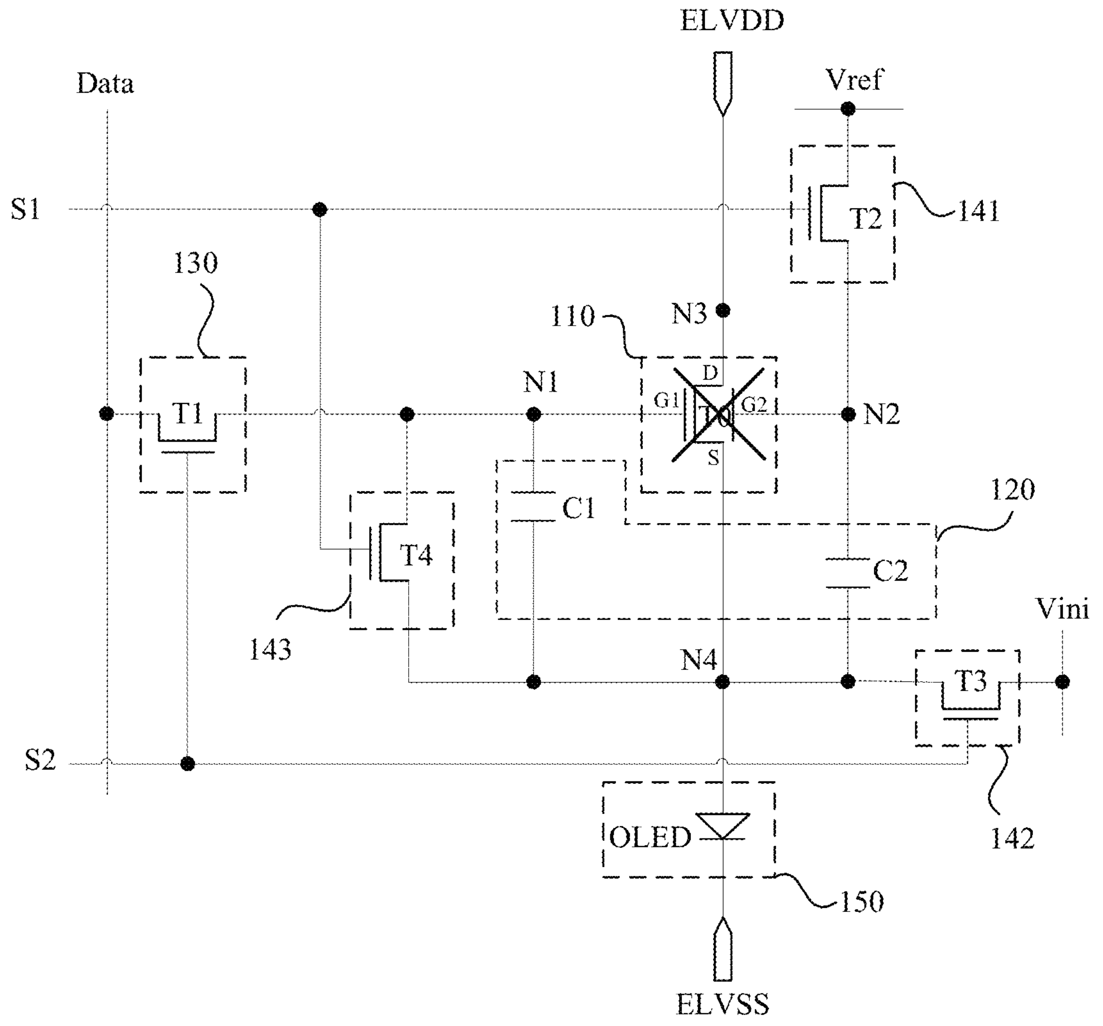
FIG. 6 is a schematic structural diagram of another pixel circuit according to an embodiment of the present application.

FIG. 6 is a schematic diagram of another pixel circuit structure according to an embodiment of the present application, and may correspond to the initialization stage t1. In the initialization stage t1, the third transistor T3 is turned on in response to a high-level signal on the second scanning line S2, and then the second initialization voltage on the second initialization signal line Vini is transmitted to the second electrode S of the dual gate transistor T0 to initialize the potential of the second electrode S. Thereafter, the second transistor T2 and the fourth transistor T4 are turned on, and then the first initialization voltage on the first initialization signal line Vref and the second initialization voltage on the second initialization signal line Vini are respectively transmitted to the second gate G2 and the first gate G1 of the dual gate transistor T0, so as to complete initialization of the potentials of the two gates of the dual gate transistor T0.

By configuring the second initialization voltage transmitted by the second initialization signal line Vini to allow the voltage difference between the second initialization voltage and the second power supply ELVSS to be smaller than the threshold voltage (light emission starting voltage) of the light emitting device OLED, it is ensured that the light emitting device OLED does not emit light in the initialization stage t1.

Since the fourth transistor T4 is turned on, a diode connection is formed between the first gate G1 and the second electrode S of the dual gate transistor T0, and the voltage difference between the first gate G1 and the second electrode S of the dual gate transistor T0 is 0V. The threshold voltage of the dual gate transistor T0 is adjusted to be greater than 0V by configuring the voltage of the second gate G2 of the dual gate transistor T0 (i.e., the first initialization voltage), to allow the dual gate transistor T0 to be in an off state.

In the initialization stage t1, the gate of the first transistor T1 is connected to the second scanning line S2, therefore, the first transistor T1 is also turned on. By sharing the second scanning line S2, the number of the scanning lines can be reduced, which facilitates reduction of the number of gate driving units. However, since the data line Data also transmits a data voltage to the first gate G1 at this time, in order to prevent the potential of the second electrode S of the dual gate transistor T0 from being pulled high, a width-to-length ratio of the first transistor T1 and a width-to-length ratio of the fourth transistor T4 may be set to be smaller than a width-to-length ratio of the third transistor T3, so that a switching speed of the third transistor T3 is greater than a switching speed of the fourth transistor T4, and the potential of the second electrode S of the dual gate transistor T0 is controlled by the second initialization voltage Vini transmitted on the second initialization signal line to prevent the data voltage and the second initialization voltage Vini from simultaneously affecting the potential of the second electrode S of the dual gate transistor T0, so as to maintain the potential of the second electrode S of the dual gate transistor T0 to be stable. Optionally, a first pulse of a signal transmitted on the second scanning line S2 may be overlap with a rising edge of a pulse of a signal transmitted on the first scanning line S1, that is, after the third transistor T3 is turned on, the second transistor T2 and the fourth transistor T4 are turned on, thereby the on-duration of the fourth transistor T4 in the initialization stage t1 can be reduced to further improve the stability of the potential of the second electrode S of the dual gate transistor T0.

Figure 7:
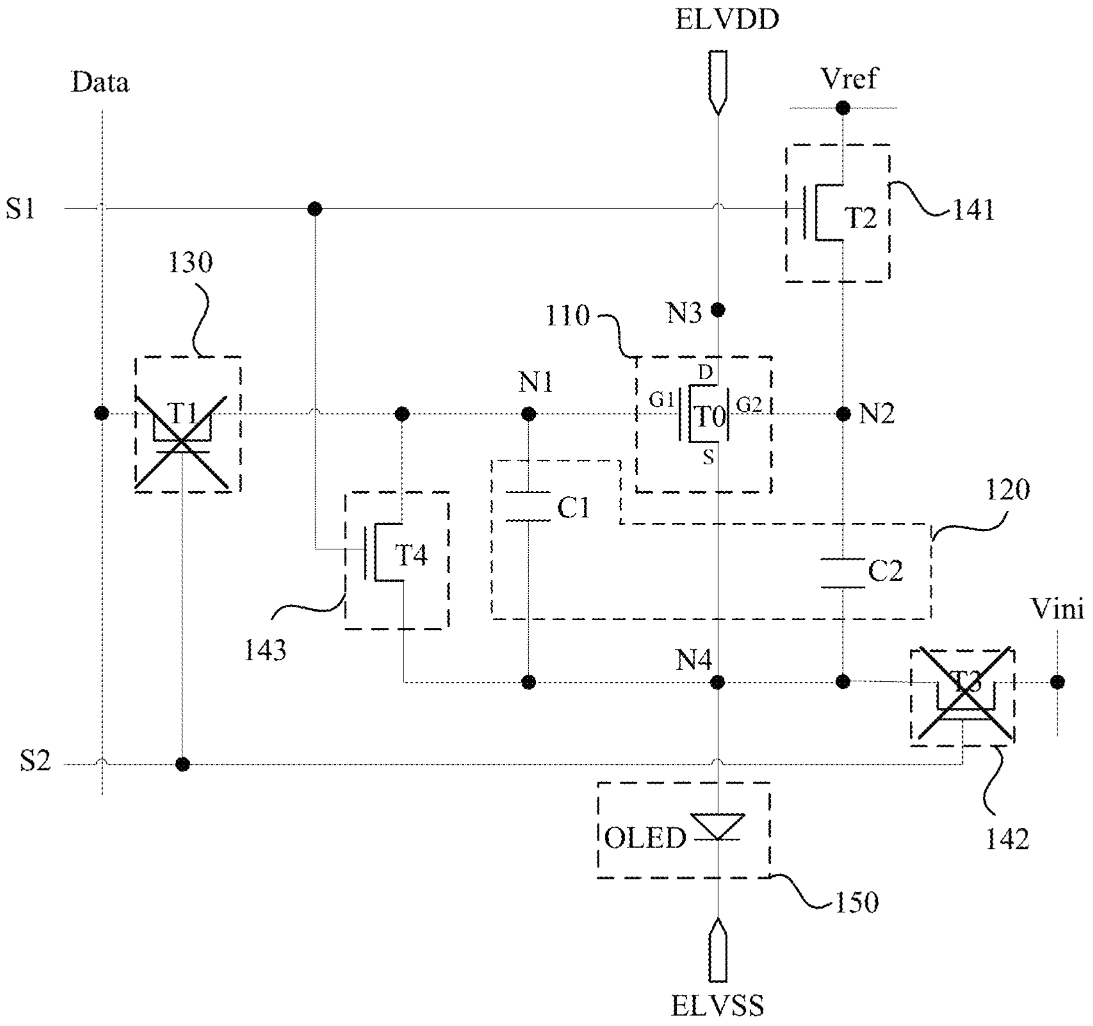
FIG. 7 is a schematic structural diagram of another pixel circuit according to an embodiment of the present application.

FIG. 7 is a schematic structural diagram of another pixel circuit according to an embodiment of the present application, which may correspond to the threshold detection stage t2. In the threshold detection stage t2, when a signal transmitted on the first scanning line S1 is a high level, and a signal transmitted on the second scanning line S2 is a low level, the first transistor T1 and the third transistor T3 are turned off, and the second transistor T2 and the fourth transistor T4 are turned on. Since the third transistor T3 is turned off, the second initialization voltage on the second initialization signal line Vini no longer controls the potential of the second electrode S of the dual gate transistor T0, the voltage of the second electrode S of the dual gate transistor T0 changes to be the sum of the voltage provided by the second power supply ELVSS and the threshold voltage of the light emitting device OLED, so that the potential of the second electrode S of the dual gate transistor T0 rises. Since the fourth transistor T4 remains in the on state, the potentials of the first gate G1 and the second electrode S of the dual gate transistor T0 are equal, and the potential of the first gate G1 rises synchronously.

However, since the potential of the second gate G2 of the dual gate transistor T0 is clamped by the first initialization voltage Vref, the voltage difference between the second gate G2 and the second electrode S changes, and the voltage difference between the second gate G2 and the second electrode S of the dual gate transistor T0 can adjust the threshold voltage of the dual gate transistor T0. By configuring the voltage of the second power supply ELVSS and the first initialization voltage Vref, the threshold voltage of the dual gate transistor T0 can be smaller than 0V, thereby controlling the dual gate transistor T0 to be turned on.

When the dual gate transistor T0 is turned on, the first power supply ELVDD charges the second electrode S of the dual gate transistor T0, and the potential of the second electrode S continues to rise. When the potential of the second electrode S of the dual gate transistor T0 rises to the voltage difference between the second gate G2 and the second electrode S, so that the threshold voltage of the dual gate transistor T0 is equal to the voltage difference between the first gate G1 and the second electrode S, that is, the threshold voltage of the dual gate transistor T0 is equal to 0V, the dual gate transistor T0 is turned off again. The voltage of the second gate G2 and the voltage of the second electrode S are stored at two terminals of the second capacitor C2, respectively, and the voltage difference between the second gate G2 and the second electrode S may just determine the threshold voltage of the dual gate transistor T0. Thus, detection of the threshold voltage of the dual gate transistor T0 is completed.

The voltage difference between the first gate G1 and the second electrode S is controlled by the fourth transistor T4 to be 0V, the threshold voltage of the dual gate transistor T0 is obtained by controlling the voltage difference between the second gate G2 and the second electrode S, and the obtained threshold voltage is also 0V, therefore, regardless of whether the threshold voltage of the dual gate transistor T0 is positive or negative, the threshold voltage of the dual gate transistor T0 can always be corrected to 0V by controlling the voltage difference between the second gate G2 and the second electrode S, and thus, the compensation range of the threshold voltage is expanded. Exemplarily, in this embodiment, the threshold voltage range of the dual gate transistor T0 may range from −5V to 5V.

Figure 8:
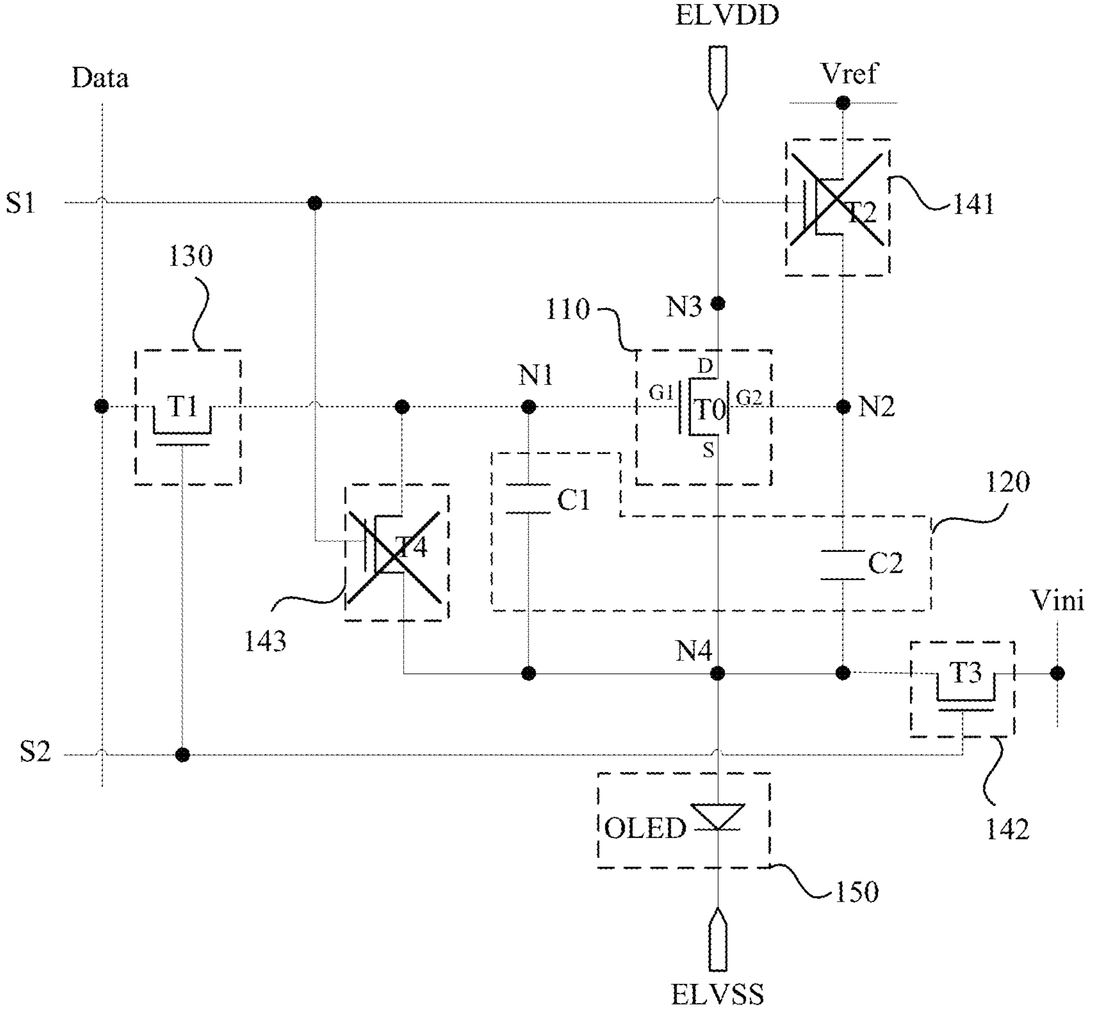
FIG. 8 is a schematic structural diagram of another pixel circuit according to an embodiment of the present application.
Figure 9:
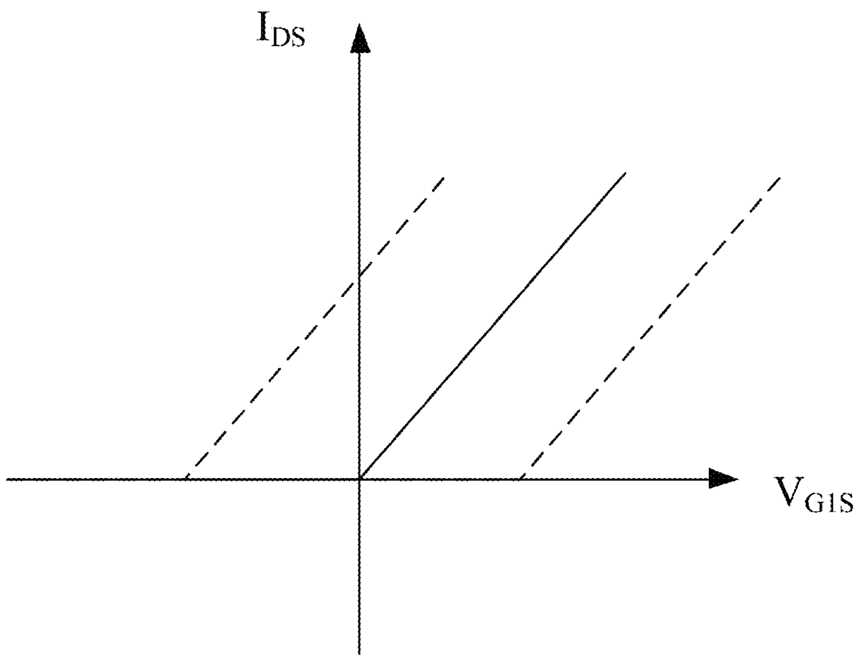
FIG. 9 shows a characteristic curve of a dual gate transistor according to an embodiment of the present application.

FIG. 8 is a schematic structural diagram of another pixel circuit according to an embodiment of the present application, which may correspond to the data writing stage t3. In the data writing stage t3, a rising edge of a second pulse of the second scanning line S2 arrives, while the first scanning line S1 outputs a low level signal, so that the first transistor T1 and the third transistor T3 are turned on, and the second transistor T2 and the fourth transistor T4 are turned off. The data voltage on the data line Data is transmitted to the first gate G1 of the dual gate transistor T0 and stored on the first capacitor C1. To prevent the light emitting device OLED from emitting light, the second initialization voltage Vini is written to the second electrode S of the dual gate transistor T0. Illustratively, FIG. 9 shows a characteristic curve of a dual-gate transistor according to an embodiment of the present application. Referring to FIG. 9, $I_{DS}$ is a current between the first electrode D and the second electrode S of the dual gate transistor T0, and $V_{G1S}$ is a voltage difference between the first gate G1 and the second electrode S of the dual gate transistor. By configuring the voltage difference between the second gate G2 and the second electrode S of the dual gate transistor T0, the threshold voltage can be corrected to 0V. For example, when the threshold voltage of the dual gate transistor T0 is negative, by configuring the second initialization voltage Vini written to the second electrode S of the dual gate transistor T0, the threshold voltage can be corrected to 0V, so that the threshold voltage is smaller than the data voltage written to the first gate G1 of the dual gate transistor T0, thereby ensuring that the dual gate transistor T0 is turned off. Moreover, by configuring the voltage of the second electrode S of the dual gate transistor T0, the effect of the light emission of the light-emitting device OLED caused by the voltage drop of the second power supply ELVSS can be reduced.

In this embodiment, the threshold detection stage t2 and the data writing stage t3 are performed separately and do not affect each other, therefore the threshold compensation and the data writing are not performed at the same time. With the technical solution according to this embodiment, the threshold compensation, while being performed, is not affected by the data writing, and the time for the threshold compensation is sufficient, so that the threshold voltage can be fully compensated, thereby avoiding the phenomenon of insufficient compensation, and thereby making the compensation range of the threshold voltage larger, and facilitating improvement of the compensation effect.

Figure 10:
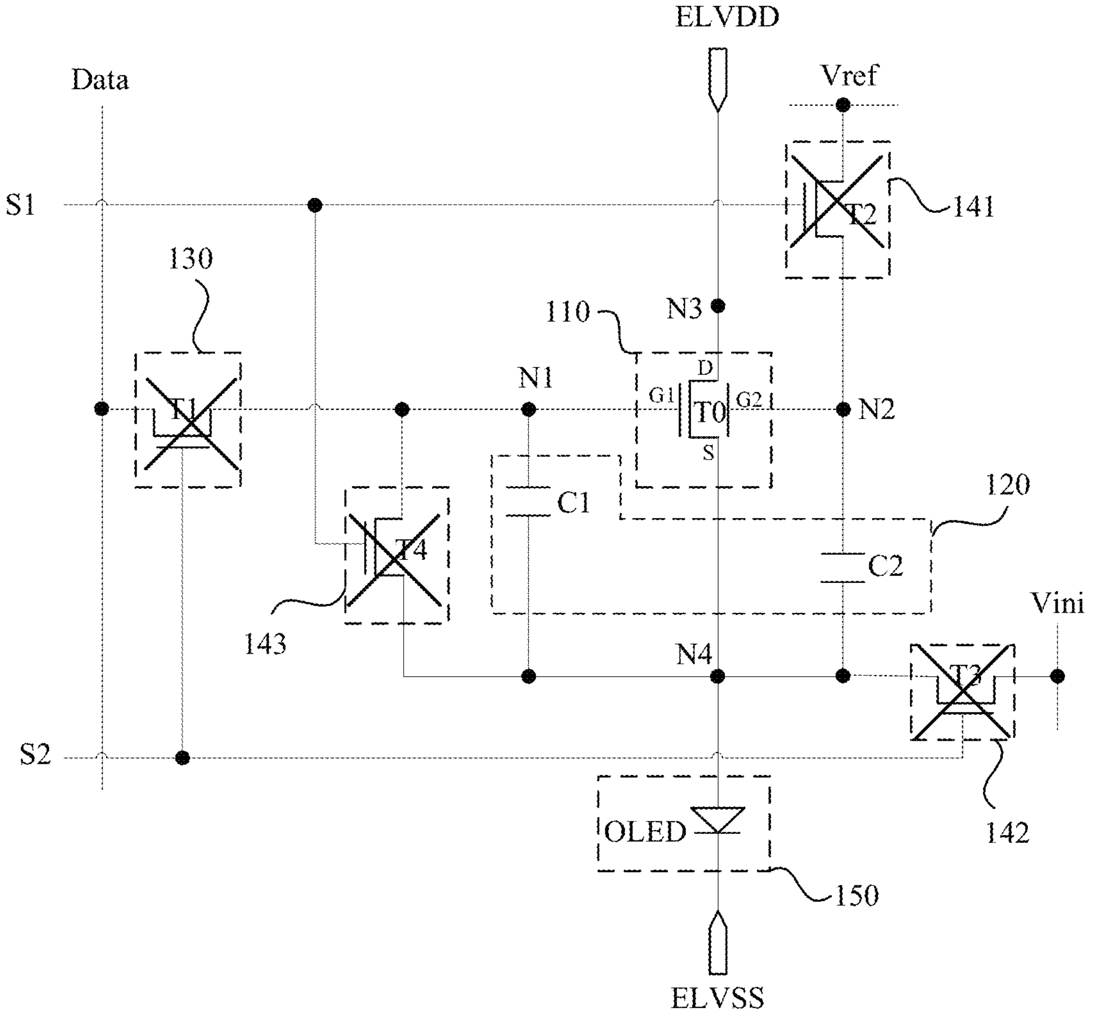
FIG. 10 is a schematic structural diagram of another pixel circuit according to an embodiment of the present application.

FIG. 10 is a schematic structural diagram of another pixel circuit according to an embodiment of the present application, which may correspond to the light emission stage t4. In the light emission stage t4, the signal output from the first scanning line S1 is a low level, and the signal output from the second scanning line S2 is a low level, so that the first transistor T1, the second transistor T2, the third transistor T3 and the fourth transistor T4 are all turned off. At this time, the potential of the second electrode S of the dual gate transistor T0 is changed, and the threshold voltage of the dual gate transistor T0 is adjusted by controlling the voltage difference between the second gate G2 and the second electrode S of the dual gate transistor, to allow the dual gate transistor T0 to be turned on, a conductive path is formed between the first power supply ELVDD and the second power supply ELVSS, and the light emitting device OLED emits light under the driving of the dual gate transistor T0. Since a voltage causing the threshold voltage of the dual gate transistor T0 to be 0V is stored in the second capacitor C2, the driving current generated by the dual gate transistor T0 is independent of the threshold voltage, thereby improving the uniformity of the display brightness.

The light-emitting current generated by the dual gate transistor T0 can be expressed as:

$$\begin{aligned} I &= \frac{1}{2}\mu C_{ox}\frac{W}{L}(V_{G1S} - Vth)^2 \\ &= \frac{1}{2}\mu C_{ox}\frac{W}{L}(V_{G1} - V_S - Vth)^2 \\ &= \frac{1}{2}\mu C_{ox}\frac{W}{L}(Vdata - Vini - Vth)^2 \end{aligned}.$$

In the threshold detection stage t2, since the threshold voltage of the dual gate transistor T0 has been corrected to 0V, the above light-emitting current is:

$$I = \frac{1}{2}\mu C_{ox}\frac{W}{L}(Vdata - Vini)^2.$$

Where, μ is an electron mobility of the dual gate transistor T0, Cox is a channel capacitance per unit area of the dual gate transistor T0, W/L is a width-to-length ratio of the dual gate transistor T0, Vth is the threshold voltage of the dual gate transistor T0, and Vdata is a data voltage supplied by the data line Data.

It can be seen from the above formula that the light-emitting current of the light-emitting device OLED is related to the data voltage Vdata and the second initialization voltage Vini, and since the threshold voltage Vth of the dual gate transistor T0 is 0V, the threshold voltage Vth of the dual gate transistor T0 does not affect the magnitude of the light-emitting current. Further, the light-emitting current is not affected by the voltage of the second power supply ELVSS, therefore, the voltage drop (IR drop) of the second power supply ELVSS can be compensated.

In this embodiment, since the stability of the dual gate transistor T0 is higher than that of a single gate transistor, the variation amount of the threshold voltage of the dual gate transistor T0 is small under the action of a long-term electric stress. Therefore, after one time of the threshold voltage detection is completed, a next time of threshold voltage detection may be performed at a relatively long interval. That is, it is not necessary to perform threshold detection for each frame, which makes the control timing of the pixel circuit simpler and the driving speed higher.

Optionally, the threshold detection stage t2 may be set in a blank stage between frames, so that the threshold voltage acquisition time is more sufficient, thereby ensuring that the threshold voltage can be fully compensated even in a large fluctuation range, thereby facilitating the expansion of the compensation range of the threshold voltage.

Further, since the threshold detection does not need to be performed for each frame, the on-durations of the second transistor T2 and the fourth transistor T4 can be reduced, and the electric stress of the second transistor T2 and the fourth transistor T4 can be reduced to a maximum extent, thereby facilitating improvement of the service life of the pixel circuit.

Apparently, in other embodiments, it is not necessary to perform initialization for each frame, and therefore, the initialization stage t1 and the threshold detection stage t2 may be performed after at least two frames. The initialization stage t1 may also be set in a blank stage between frames. If the initialization stage t1 is set in the blank stage, the data line Data may also be reused as the first initialization signal line Vref, that is, the second transistor T2 is connected to the data line Data, thereby saving the first initialization signal line Vref. In the initialization stage, the initialization voltage is supplied to the second transistor T2 through the data line Data, so that the number of the first initialization signal lines Vref can be reduced, thereby facilitating the improvement of the PPI, and moreover, the panel design can be simplified.

In the pixel circuit according to this embodiment, the light-emitting control transistor is not required to be provided. Therefore, in the pixel circuit, the crossover voltage of the first power supply ELVDD and the second power supply ELVSS will not be consumed by the light-emitting control transistor, thereby facilitating reduction of the crossover voltage of the first power supply ELVDD and the second power supply ELVSS, and further improving the voltage stability of the first power supply ELVDD and the second power supply ELVSS. The pixel circuit according to this embodiment of the present application does not need to be provided with a light-emitting control transistor, so that the occupied area of the pixel circuit is significantly reduced, which facilitates realization of high pixel density.

In this embodiment, the voltage at both terminals of the second capacitor C2 can be kept unchanged during the threshold voltage compensation. Therefore, after the pixel circuit is prepared, the threshold voltage can be detected by an external compensation method to ensure the uniformity of the display brightness.

Optionally, a driving method for a pixel circuit is further provided according to an embodiment of the present application, which is applicable to the pixel circuit according to any embodiment of the present application. Referring to FIG. 1, the pixel circuit includes a driving module 110, a storage module 120, a data writing module 130, an initialization module 140 and a light emitting module 150. The driving module 110 includes a dual gate transistor T0, a first electrode of the dual gate transistor T0 is connected to a first power supply ELVDD, a second electrode of the dual gate transistor T0 is connected to a first terminal of the light emitting module 150, and a second terminal of the light emitting module 150 is connected to a second power supply ELVSS. The data writing module 130 is connected between a first gate G1 of the dual gate transistor T0 and a data line Data. The storage module 120 is connected to the first gate G1, a second gate G2, and the second electrode S of the dual gate transistor T0. The initialization module 140 is connected to the first gate G1, the second gate G2 and the second electrode S of the dual gate transistor T0 and an initialization signal line Rest.

Figure 11:
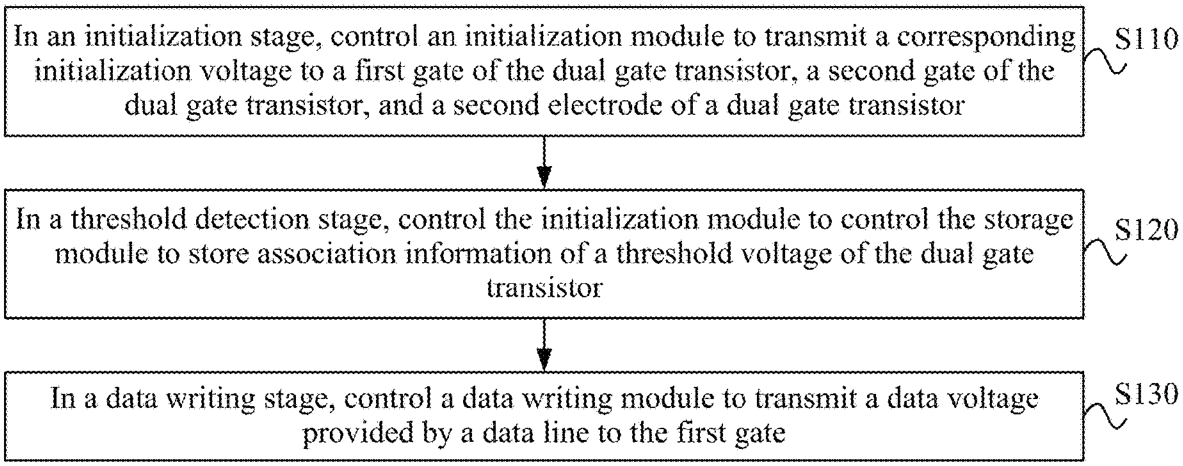
FIG. 11 is a flowchart of a driving method for a pixel circuit according to an embodiment of the present application.

FIG. 11 a flowchart of a driving method for the pixel circuit according to an embodiment of the present application. Referring to FIG. 11, the driving method includes steps as follows.

In S110, in an initialization stage, the initialization module is controlled to transmit a corresponding initialization voltage to the first gate of the dual gate transistor, the second gate of the dual gate transistor, and the second electrode of the dual gate transistor.

In S120, in a threshold detection stage, the initialization module is controlled to control the storage module to store association information of a threshold voltage of the dual gate transistor.

In S130, in a data writing stage, the data writing module is controlled to transmit a data voltage provided by the data line to the first gate of the dual gate transistor.

According to the control method for a pixel circuit provided in the embodiment of the present application, in the initialization stage, the initialization module is controlled to transmit a corresponding initialization voltage to the first gate, the second gate, and the second electrode of the dual gate transistor, to initialize the potentials of the first gate, second gate and second electrode of the dual gate transistor; in the threshold detection stage, the initialization module is controlled to control the storage module to store association information of the threshold voltage of the dual gate transistor, to realize detection and compensation for the threshold voltage of the dual gate transistor; and in the data writing stage, the data voltage is written by the data writing module into the first gate of the dual gate transistor. According to the technical solution provided in the embodiment of the present application, the initialization module controls the potentials of the first gate, the second gate and the second electrode of the dual gate transistor, and controls the first gate and the second electrode of the dual gate transistor to form a diode connection structure, to allow the threshold voltage of the dual gate transistor to be determined by a potential difference between the second gate and the second electrode, thereby realizing the compensation effect of the threshold voltage of the dual gate transistor. The threshold compensation and the data writing are respectively realized through two separate paths, which do not affect each other. By controlling the on-duration of the initialization module, the duration of the compensation for the threshold voltage can be controlled, so that the threshold voltage fluctuation in a large range can be compensated, and the threshold voltage can be fully compensated, thereby facilitating improvement of the display effect.

Further, referring to FIG. 4, the initialization signal line Rest includes a first initialization signal line Vref and a second initialization signal line Vini. The initialization module 140 includes a first initialization module 141, a second initialization module 142 and a third initialization module 143. The first initialization module 141 is connected between the first initialization signal line Vref and the second gate G2, and a control terminal of the first initialization module 141 is connected to a first scanning line S1. The second initialization module 142 is connected between the second initialization signal line Vini and the second electrode S of the dual gate transistor T0, and a control terminal of the second initialization module 142 is connected to a second scanning line S2. The third initialization module 143 is connected between the first gate G1 and the second electrode S of the dual gate transistor T0, and a control terminal of the third initialization module 143 is connected to the first scanning line S1.

The data writing module 130 includes a first transistor T1, the first initialization module 141 includes a second transistor T2, the second initialization module 142 includes a third transistor T3, and the third initialization module 143 includes a fourth transistor T4. The storage module 120 includes a first capacitor C1 and a second capacitor C2. With reference to the control timing shown in FIG. 5, the driving method further includes: in the initialization stage t1, a second scanning signal transmitted by the second scanning line S2 controls the second initialization module 142 to be turned on, and after a preset on-duration, a first scanning signal transmitted by the first scanning line S1 controls the first initialization module 141 and the third initialization module 143 to be turned on.

Specifically, by configuring the second initialization voltage transmitted by the second initialization signal line Vini to allow the voltage difference between the second initialization voltage and the second power supply ELVSS to be smaller than the threshold voltage (light emission starting voltage) of the light emitting device OLED, it is ensured that the light emitting device OLED does not emit light in the initialization stage t1.

At this time, since the fourth transistor T4 is turned on, a diode connection is formed between the first gate G1 and the second electrode S of the dual gate transistor T0, and the voltage difference between the first gate G1 and the second electrode S of the dual gate transistor T0 is 0V. The threshold voltage of the dual gate transistor T0 is adjusted to be greater than 0V by configuring the voltage of the second gate G2 of the dual gate transistor T0 (i.e., the first initialization voltage), to allow the dual gate transistor T0 to be in an off state.

Further, in the initialization stage t1, the gate of the first transistor T1 is connected to the second scanning line S2, therefore, the first transistor T1 is also turned on. By sharing the second scanning line S2, the number of the scanning lines can be reduced, which facilitates reduction of the number of gate driving units. Since the data line Data also transmits a data voltage to the first gate G1 at this time, in order to prevent the potential of the second electrode S of the dual gate transistor T0 from being pulled high, a width-to-length ratio of the first transistor T1 and a width-to-length ratio of the fourth transistor T4 may be set to be smaller than a width-to-length ratio of the third transistor T3 so that a switching speed of the third transistor T3 is greater than a switching speed of the fourth transistor T4, and the potential of the second electrode S of the dual gate transistor T0 is controlled by the second initialization voltage Vini transmitted on the second initialization signal line to prevent the data voltage and the second initialization voltage Vini from simultaneously affecting the potential of the second electrode S of the dual gate transistor T0 to maintain the potential of the second electrode S of the dual gate transistor T0 to be stable. It is also possible to control that after the third transistor T3 has been turned on for a preset duration, the second transistor T2 and the fourth transistor T4 are then turned on. Thus, the on-duration of the fourth transistor T4 in the initialization stage t1 can be reduced to further improve the stability of the potential of the second electrode S of the dual gate transistor T0.

In the threshold detection stage t2, the second scanning signal S2 controls the second initialization module 142 to be turned off, and the first scanning signal S1 controls the first initialization module 141 and the third initialization module 143 to be turned on.

Specifically, since the third transistor T3 is turned off, the second initialization voltage on the second initialization signal line Vini no longer controls the potential of the second electrode S of the dual gate transistor T0, the voltage of the second electrode S of the dual gate transistor T0 changes to be the sum of the voltage of the second power supply ELVSS and the threshold voltage of the light emitting device OLED, and the potential of the second electrode S rises. Since the fourth transistor T4 remains in the on state, the potentials of the first gate G1 and the second electrode S of the dual gate transistor T0 are equal, and the potential of the first gate G1 rises synchronously.

However, since the potential of the second gate G2 of the dual gate transistor T0 is clamped by the first initialization voltage Vref, the voltage change of the second electrode S causes changes of the voltage difference between the second gate G2 and the second electrode S, and the voltage difference between the second gate G2 and the second electrode S of the dual gate transistor T0 can adjust the threshold voltage of the dual gate transistor T0. By configuring the voltage of the second power supply ELVSS and the first initialization voltage Vref, the threshold voltage of the dual gate transistor T0 can be made smaller than 0V, thereby controlling the dual gate transistor T0 to be turned on.

When the dual gate transistor T0 is turned on, the first power supply ELVDD charges the second electrode S of the dual gate transistor T0, and the potential of the second electrode S continues to rise. When the potential of the second electrode S of the dual gate transistor T0 rises to the voltage difference between the second gate G2 and the second electrode S, such that the threshold voltage of the dual gate transistor T0 is equal to the voltage difference between the first gate G1 and the second electrode S, that is, the threshold voltage of the dual gate transistor T0 is equal to 0V, the dual gate transistor T0 is turned off again. The voltage of the second gate G2 and the voltage of the second electrode S are stored at two terminals of the second capacitor C2, respectively, and the voltage difference between the second gate G2 and the second electrode S may just determine the threshold voltage of the dual gate transistor T0. Thus, detection of the threshold voltage of the dual gate transistor T0 is completed.

In the data writing stage t3, the second scanning signal S2 controls the data writing module 130 and the second initialization module 142 to be turned on, and the first scanning signal S1 controls the first initialization module 141 and the third initialization module 143 to be turned off.

Specifically, the data voltage on the data line Data is transmitted to the first gate G1 of the dual gate transistor T0 and stored on the first capacitor C1. To prevent the light emitting device OLED from emitting light, the second initialization voltage Vini is written to the second electrode S of the dual gate transistor T0. By configuring the voltage of the second electrode S of the dual gate transistor T0, the effect of the light emission of the light-emitting device OLED caused by the voltage drop of the second power supply ELVSS can be reduced.

In the light emission stage t4, the second scanning signal S2 controls the data writing module 130 and the second initialization module 142 to be turned off, and the first scanning signal S1 controls the first initialization module 141 and the third initialization module 143 to be turned off.

Specifically, since the third transistor T3 is turned off, the potential of the second electrode S of the dual gate transistor T0 is changed, and the threshold voltage of the dual gate transistor T0 is adjusted by controlling the voltage difference between the second gate G2 and the second electrode S to allow the dual gate transistor T0 to be turned on, a conductive path is formed between the first power supply ELVDD and the second power supply ELVSS, and the light emitting device OLED emits light under the driving of the dual gate transistor T0. Since a voltage causing the threshold voltage of the dual gate transistor T0 to be 0V is stored in the second capacitor C2, the driving current generated by the dual gate transistor T0 is independent of the threshold voltage, thereby improving the uniformity of the display brightness.

In this embodiment, the initialization stage and the threshold detection stage are performed in each frame or after at least two frames, and the data writing stage and the light emission stage are performed in each frame.

Specifically, since the stability of the dual gate transistor T0 is higher than that of a single-gate transistor, the variation amount of the threshold voltage of the dual gate transistor T0 is small under the action of a long-term electric stress. Therefore, after one time of the threshold voltage detection is completed, a next time of threshold voltage detection may be performed at a relatively long interval. That is, it is not necessary to perform threshold detection for each frame, which makes the control timing of the pixel circuit simpler and the driving speed higher. Similarly, it is not necessary to perform the initialization operation for each frame.

Preferentially, the initialization stage and the threshold detection stage are in a blank stage between frames, so that the time for the initialization and the threshold voltage acquisition is more sufficient, thereby ensuring that the potentials of the first gate G1, the second gate G2, and the second electrode S of the dual gate transistor T0 are fully initialized, and ensuring that the threshold voltage can be fully compensated even in a large fluctuation range, thereby facilitating the expansion of the compensation range of the threshold voltage. In the case where the initialization stage and the threshold value detection stage are in a blank stage between frames, the data line Data may also serve as the first initialization signal line to transmit the first initialization voltage Vref, so that the number of initialization signal lines can be reduced, improvement of the PPI is facilitated, the design of the display panel can be simplified, and the cost can be reduced.

Figure 12:
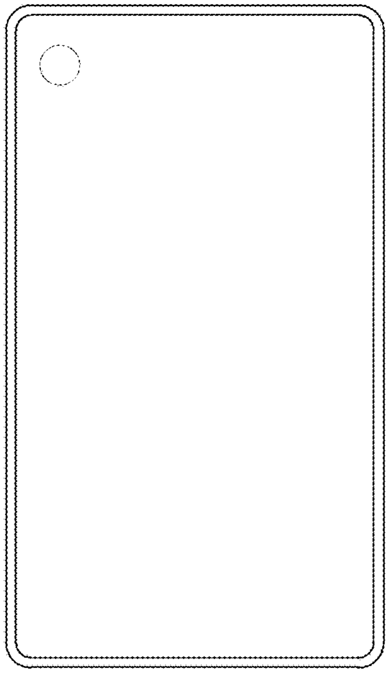
FIG. 12 is a schematic structural diagram of a display panel according to an embodiment of the present application.

Optionally, an embodiment of the present application further provides a display panel. The display panel includes the pixel circuit according to any of the embodiments of the present application. Therefore, the display panel according to the embodiments of the present application also has beneficial effects described in any of the above-described embodiments. FIG. 12 is a schematic structural diagram of a display panel according to an embodiment of the present application. Referring to FIG. 12, the display panel may be a mobile phone panel shown in FIG. 12, or may be a panel of any electronic product that has a display function, including but not limited to a television, a notebook computer, a desktop type display, a tablet computer, a digital camera, a smart band, smart glasses, an in-vehicle display, a medical device, an industrial control device, and a touch interaction terminal, which are not specifically limited in the embodiments of the present application.

It should be noted that the above-described contents are only preferred embodiments of the present application and the technical principles applied thereto. It is to be understood by the person skilled in the art that the present application is not limited to the particular embodiments described herein, and for the person skilled in the art, various apparent variations, rearrangements and substitutions may be made without departing from the protection scope of the present application. Therefore, although the present application has been described in detail with reference to the above embodiments, the present application is not limited to the above embodiments, and may further include other more equivalent embodiments without departing from the concept of the present application, and the scope of the present application is defined by the scope of the appended claims.

What is claimed is:

1. A pixel circuit comprising:

a light emitting module;

a driving module, wherein the driving module comprises a dual gate transistor, a first electrode of the dual gate transistor is connected to a first power supply, a second electrode of the dual gate transistor is connected to a first terminal of the light emitting module, and a second terminal of the light emitting module is connected to a second power supply;

a storage module, wherein the storage module is connected to a first gate of the dual gate transistor, a second gate of the dual gate transistor, and the second electrode of the dual gate transistor;

a data writing module, wherein the data writing module is connected between the first gate of the dual gate transistor and a data line, and is configured to transmit a data voltage output by the data line to the first gate of the dual gate transistor;

an initialization module, wherein the initialization module is connected to the first gate of the dual gate transistor, the second gate of the dual gate transistor and the second electrode of the dual gate transistor and an initialization signal line, the initialization signal line comprises a first initialization signal line and a second initialization signal line, and the initialization module is configured to:

transmit a first initialization voltage provided by the first initialization signal line to the second gate of the dual gate transistor;

transmit a second initialization voltage provided by the second initialization signal line to the first gate of the dual gate transistor and the second electrode of the dual gate transistor; and control the storage module to store association information of a threshold voltage of the dual gate transistor, and the initialization module further comprises:

a first initialization module connected between the first initialization signal line and the second gate, wherein a control terminal of the first initialization module is connected to a first scanning line, a second initialization module connected between the second initialization signal line and the second electrode of the dual gate transistor, wherein a control terminal of the second initialization module is connected to a second scanning line; and a third initialization module connected between the first gate of the dual gate transistor and the second electrode of the dual gate transistor, wherein a control terminal of the third initialization module is connected to the first scanning line, and, in an initialization stage, the second initialization module is turned on, and after the second initialization module is turned on, the first initialization module and the third initialization module are turned on.

2. The pixel circuit according to claim 1, wherein the data line is reused as the first initialization signal line to supply an initialization voltage to the initalization module.

3. The pixel circuit according to claim 1, wherein the first gate is a top gate and the second gate is a bottom gate, the data writing module comprises a first transistor, the first initialization module comprises a second transistor, the second initialization module comprises a third transistor, the third initialization module comprises a fourth transistor, the storage module comprises a first capacitor and a second capacitor, a first electrode of the first transistor is connected to the data line, a second electrode of the first transistor is connected to the first gate of the dual gate transistor, a gate of the first transistor is connected to the second scanning line, a first electrode of the second transistor is connected to the first initialization signal line, a second electrode of the second transistor is connected to the second gate of the dual gate transistor, a gate of the second transistor is connected to the first scanning line, a first electrode of the third transistor is connected to the second initialization signal line, a second electrode of the third transistor is connected to the second electrode of the dual gate transistor, a gate of the third transistor is connected to the second scanning line, a first electrode of the fourth transistor is connected to the first gate of the dual gate transistor, a second electrode of the fourth transistor is connected to the second electrode of the dual gate transistor, a gate of the fourth transistor is connected to the first scanning line, the first capacitor is connected between the first gate of the dual gate transistor and the second electrode of the dual gate transistor, and the second capacitor is connected between the second gate of the dual gate transistor and the second electrode of the dual gate transistor.

4. The pixel circuit according to claim 3, wherein a width-to-length ratio of the fourth transistor is smaller than a width-to-length ratio of the third transistor.

5. The pixel circuit according to claim 3, wherein, in a frame, a signal transmitted by the second scanning line comprises a first pulse and a second pulse, an interval of the first pulse overlaps a rising edge of a pulse of a signal transmitted by the first scanning line, and the second pulse follows the pulse of the signal transmitted by the first scanning line.

6. The pixel circuit according to claim 3, wherein the first scanning line and the second scanning line, the first initialization signal line and the second initialization signal line are configured to transmit a driving signal to satisfy that:

in the initialization stage, the third transistor is turned on, and after the third transistor is turned on, the second transistor and the fourth transistor are turned on;

in a threshold detection stage, the second transistor and the fourth transistor are turned on, and the third transistor is turned off;

in a data writing stage, the first transistor and the third transistor are turned on, and the second transistor and the fourth transistor are turned off; and in a light emission stage, the first transistor, the second transistor, the third transistor and the fourth transistor are turned off.

7. A method for a pixel circuit, wherein the pixel circuit comprises:

a light emitting module;

a driving module, wherein the driving module comprises a dual gate transistor, a first electrode of the dual gate transistor is connected to a first power supply, a second electrode of the dual gate transistor is connected to a first terminal of the light emitting module, and a second terminal of the light emitting module is connected to a second power supply;

a storage module, wherein the storage module is connected to a first gate of the dual gate transistor, a second gate of the dual gate transistor, and the second electrode of the dual gate transistor;

a data writing module, wherein the data writing module is connected between the first gate of the dual gate transistor and a data line;

an initialization module, wherein the initialization module is connected to the first gate of the dual gate transistor, the second gate of the dual gate transistor and the second electrode of the dual gate transistor and an initialization signal line, the initialization signal line comprises a first initialization signal line and a second initialization signal line, and the initialization module is configured to:

transmit a first initialization voltage provided by the first initialization signal line to the second gate of the dual gate transistor;

transmit a second initialization voltage provided by the second initialization signal line to the first gate of the dual gate transistor and the second electrode of the dual gate transistor; and control the storage module to store association information of a threshold voltage of the dual gate transistor, and the initialization module further comprises:

a first initialization module connected between the first initialization signal line and the second gate, wherein a control terminal of the first initialization module is connected to a first scanning line;

a second initialization module connected between the second initialization signal line and the second electrode of the dual gate transistor, wherein a control terminal of the second initialization module is connected to a second scanning line; and a third initialization module connected between the first gate of the dual gate transistor and the second electrode of the dual gate transistor, wherein a control terminal of the third initialization module is connected to the first scanning line, and the method comprises:

in an initialization stage, the second initialization module is turned on, and after the second initialization module is turned on, the first initialization module and the third initialization module are turned on;

in a threshold detection stage, controlling the initialization modules to control the storage module to store association information of a threshold voltage of the dual gate transistor; and in a data writing stage, controlling the data writing module to transmit a data voltage provided by the data line to the first gate of the dual gate transistor.

8. The method according to claim 7, wherein the storage module comprises a first capacitor and a second capacitor, and the method further comprises:

in the initialization stage, controlling, by a second scanning signal transmitted by the second scanning line, the second initialization module to be turned on, and after a preset on-duration, controlling, by a first scanning signal transmitted by the first scanning line, the first initialization module and the third initialization module to be turned on;

in the threshold detection stage, controlling, by the second scanning signal, the second initialization module to be turned off, and controlling, by the first scanning signal, the first initialization module and the third initialization module to be turned on;

in the data writing stage, controlling, by the second scanning signal, the data writing module and the second initialization module to be turned on, and controlling, by the first scanning signal, the first initialization module and the third initialization module to be turned off; and in the light emission stage, controlling, by the second scanning signal, the data writing module and the second initialization module to be turned off, and controlling, by the first scanning signal, the first initialization module and the third initialization module to be turned off.

9. The method according to claim 8, wherein the initialization stage and the threshold detection stage are performed in each frame or every time after at least two frames, and the data writing stage and the light emission stage are performed in each frame.

10. The method according to claim 9, wherein the initialization stage and the threshold detection stage are in a blank stage between frames.

11. A display panel comprising a pixel circuit, wherein the pixel circuit comprises:

a light emitting module;

a driving module, wherein the driving module comprises a dual gate transistor, a first electrode of the dual gate transistor is connected to a first power supply, a second electrode of the dual gate transistor is connected to a first terminal of the light emitting module, and a second terminal of the light emitting module is connected to a second power supply;

a storage module, wherein the storage module is connected to a first gate of the dual gate transistor, a second gate of the dual gate transistor, and the second electrode of the dual gate transistor;

a data writing module, wherein the data writing module is connected between the first gate of the dual gate transistor and a data line, and is configured to transmit a data voltage output by the data line to the first gate of the dual gate transistor; and an initialization module, wherein the initialization module is connected to the first gate of the dual gate transistor, the second gate of the dual gate transistor and the second electrode of the dual gate transistor and an initialization signal line, the initialization signal line comprises a first initialization signal line and a second initialization signal line, and the initialization module is configured to:

transmit a first initialization voltage provided by the first initialization signal line to the second gate of the dual gate transistor;

transmit a second initialization voltage provided by the second initialization signal line to the first gate of the dual gate transistor and the second electrode of the dual gate transistor; and control the storage module to store association information of a threshold voltage of the dual gate transistor, and the initialization module further comprises:

a first initialization module connected between the first initialization signal line and the second gate, wherein a control terminal of the first initialization module is connected to a first scanning line;

a second initialization module connected between the second initialization signal line and the second electrode of the dual gate transistor, wherein a control terminal of the second initialization module is connected to a second scanning line; and a third initialization module connected between the first gate of the dual gate transistor and the second electrode of the dual gate transistor, wherein a control terminal of the third initialization module is connected to the first scanning line, and, in an initialization stage, the second initialization module is turned on, and after the second initialization module is turned on, the first initialization module and the third initialization module are turned on.

12. The display panel according to claim 11, wherein the data line is reused as the first initialization signal line.

13. The display panel according to claim 11, wherein the first gate is a top gate and the second gate is a bottom gate, the data writing module comprises a first transistor, the first initialization module comprises a second transistor, the second initialization module comprises a third transistor, the third initialization module comprises a fourth transistor, the storage module comprises a first capacitor and a second capacitor; a first electrode of the first transistor is connected to the data line, a second electrode of the first transistor is connected to the first gate of the dual gate transistor, a gate of the first transistor is connected to the second scanning line, a first electrode of the second transistor is connected to the first initialization signal line, a second electrode of the second transistor is connected to the second gate of the dual gate transistor, a gate of the second transistor is connected to the first scanning line, a first electrode of the third transistor is connected to the second initialization signal line, a second electrode of the third transistor is connected to the second electrode of the dual gate transistor, a gate of the third transistor is connected to the second scanning line, a first electrode of the fourth transistor is connected to the first gate of the dual gate transistor, a second electrode of the fourth transistor is connected to the second electrode of the dual gate transistor, a gate of the fourth transistor is connected to the first scanning line, the first capacitor is connected between the first gate of the dual gate transistor and the second electrode of the dual gate transistor, and the second capacitor is connected between the second gate of the dual gate transistor and the second electrode of the dual gate transistor.

14. The display panel according to claim 13, wherein a width-to-length ratio of the fourth transistor is smaller than a width-to-length ratio of the third transistor.

15. The display panel according to claim 13, wherein, in a frame, a signal transmitted by the second scanning line comprises a first pulse and a second pulse, an interval of the first pulse overlaps a rising edge of a pulse of a signal transmitted by the first scanning line, and the second pulse follows the pulse of the signal transmitted by the first scanning line.

16. The method according to claim 8, wherein the initialization stage and the threshold detection stage are performed in each frame or every time after at least two frames, and the data writing stage and the light emission stage are performed in each frame.

17. The pixel circuit of claim 2, wherein different voltages are used during the initialization stage and a data writing stage.

18. The pixel circuit of claim 3, wherein, when the third transistor of the second initialization module is turned on, the first transistor of the data writing module is first turned on.

19. The pixel circuit of claim 4, wherein a width-to-length ratio of the first transistor is smaller than a width-to-length ratio of the third transistor.

* * * * *